United States Patent
Tsay

(10) Patent No.: US 6,944,294 B2
(45) Date of Patent: Sep. 13, 2005

(54) MOBILE PHONE HAND-FREE HOLDER

(76) Inventor: Wen-Feng Tsay, P.O. Box 24-108, Taipei (TW)

( * ) Notice: Subject to any disclaimer, the term of this patent is extended or adjusted under 35 U.S.C. 154(b) by 469 days.

(21) Appl. No.: 10/292,943

(22) Filed: Nov. 13, 2002

(65) Prior Publication Data

US 2004/0091102 A1 May 13, 2004

(51) Int. Cl.$^7$ ................................................ H04M 1/00
(52) U.S. Cl. ....................................... 379/446; 379/455
(58) Field of Search ................................ 379/446, 454, 379/455, 449; 455/90.3; 248/316.4, 231.41

(56) References Cited

U.S. PATENT DOCUMENTS 5,694,468 A * 12/1997 Hsu ........................... 379/446
5,903,645 A * 5/1999 Tsay ........................... 379/455

* cited by examiner

Primary Examiner—Jack Chiang

(57) ABSTRACT

An improved structure of a mobile phone hand-free holder, includes a holder, an upper casing, a lower casing, a resilient locking seat and a press lever; a cross link pivoted to the center; an insertion protruding from end of the pivot to slide in a lateral slide way in the upper casing, both ends of the cross link being connected respectively to both sides of the holder; one side of the holder is serrated at the edge; the locking seat being provided by the serration to have two stoppers protruding into the serration to force the holder to only press inwardly to be held in position; an earphone socket also functioning as a switch to control transmission of an incoming call to be received by a cordless earphone or an external speaker or a car radio; the lateral displacement of the cross link in the slide way to deflect the center to hold a mobile phone with its plug socket not provided at the center.

3 Claims, 4 Drawing Sheets

US 6,944,294 B2

MOBILE PHONE HAND-FREE HOLDER

BACKGROUND OF THE INVENTION (a) Field of the Invention

The present invention is related to a mobile phone hand-free holder, and more particularly to an improved structure of a hand-free holder for a mobile phone, a U.S. Pat. No. 5,903,645 granted to this same inventor that can be adjusted to hold mobile phone with its plug socket not provided at the center, and to switch the receiving of an incoming phone between a cordless earphone or a car radio or an externally connected loudspeaker.

(b) Description of the Prior Art

Mobile phone has become so popular now either for emergency contact, business talk or simply having a chat. However, to cope with the needs for recharging the battery for the mobile phone or to comply with traffic law that prohibits holding a mobile phone while driving a car, a holder exclusively for the mobile phone is provided in a car. At the beginning, such holder was of a box type. It was useful for a particular model of mobile phone and was comparatively expensive to have one. Later, a holder was developed to secure the mobile phone by pressing it in position, such as the one disclosed in U.S. Pat. No. 5,903,645 patent by this same inventor. It provides improvement either in linkage of structure, easy access, reduced cost and wide coverage of application. However, at present, there are more than a dozen of mobile phone manufacturers, and each is so anxiously to introduce updated model from time to time. As the plug socket adapted to the mobile phone varies depending on the manufacturer, gaps are usually reserved at the center of the base of the holder while developing the tooling for the manufacturing of the mobile phone hand-free holder so to cope with various types of adapter socket from different models. This problem is not so difficult to be solved. Certain models have not located their plug sockets at the center for the purpose of permitting expanded functions or having a unique style design. Such mobile phone prevents from being securely seated in the holder. Accordingly, another set of tooling must be developed to suffer disadvantages of higher production cost, limited range of application, increased inventory of parts and storage capacity. Furthermore, while receiving an incoming call in the car, one may not wish the conversation to be overheard by the passenger(s) or on the contrary, he may wish that all passengers shared the talk with him. No alternative between private talk and talk over a speaker is pending improvement. Besides, the plugging in and out of an earphone would compromise drive safety.

SUMMARY OF THE INVENTION

The primary purpose of the present invention is to provide an improved structure of a hand free holder for a mobile phone that can be adapted to a mobile phone with its plug socket not provided at the center of its base. To achieve the purpose, the holder is respectively connected to both ends of a cross link pivoted to the center of the holder; an insertion is provided to the end of the pivot of the cross link to slide in a lateral slide way in the upper casing; a coil spring is each provided to both sides of the slide way. The holder comprised of two identical halves has a serration provided on the edge of one side of each half. A resilient locking seat in U-shape is provided by the serration and has two stoppers protruding into the serration to cause the holder to only press inwardly and to be secured in position. Consequently, while pressing to hold the mobile phone in place, the holder is capable of pursuing the insertion provided to the pivot of the cross link to laterally displace along the slide way for the press center to deflect for securing a mobile phone having its plug socket not provided at the center in position.

Another purpose of the present invention is to provide an improved structure of a hand free holder for a mobile phone that may switch the transmission of an incoming call to a cordless earphone if privacy is desired or to a car radio or an externally connected speaker.

To achieve the purpose, a socket for the cordless earphone is also provided on the casing of the holder and it also functions as a switch to control the transmission of an incoming call to a cordless earphone if privacy is desired or to a car radio or an externally connected speaker

DETAILED DESCRIPTION OF THE PREFERRED EMBODIMENTS

Figure 1:
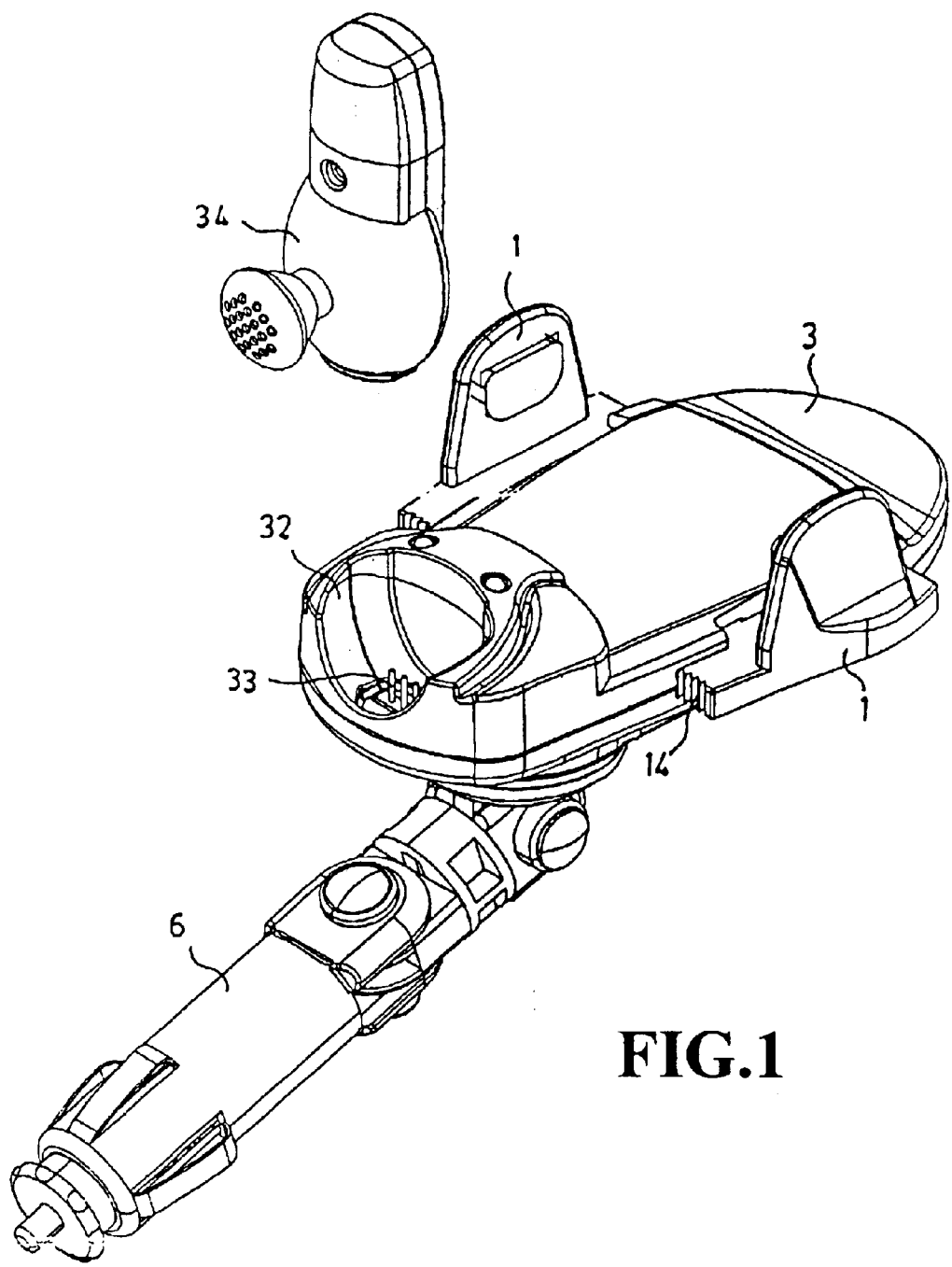
FIG. 1 is a perspective view of a preferred embodiment of the present invention.
Figure 2:
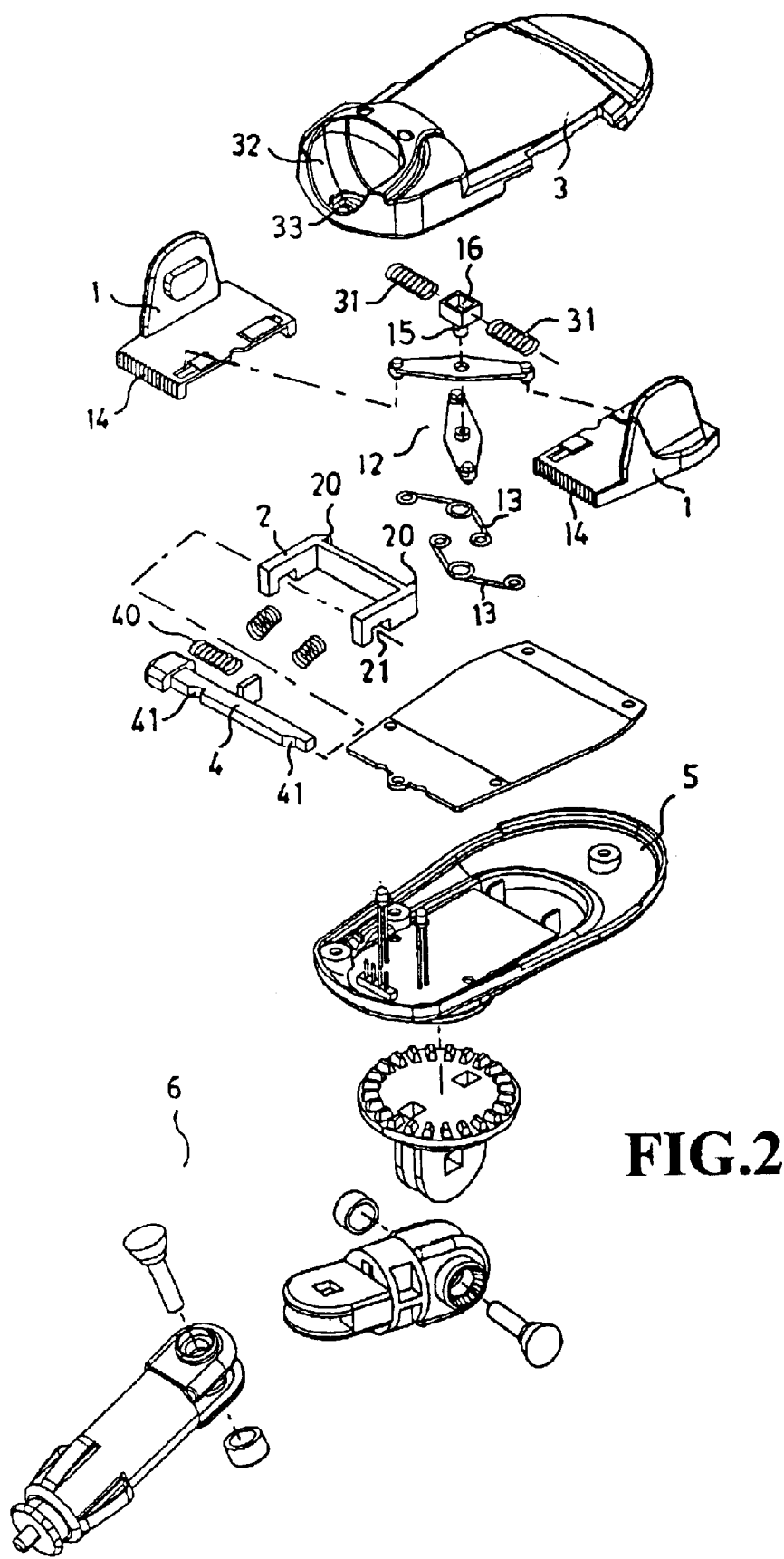
FIG. 2 is an exploded view of the preferred embodiment of the present invention.
Figure 3:
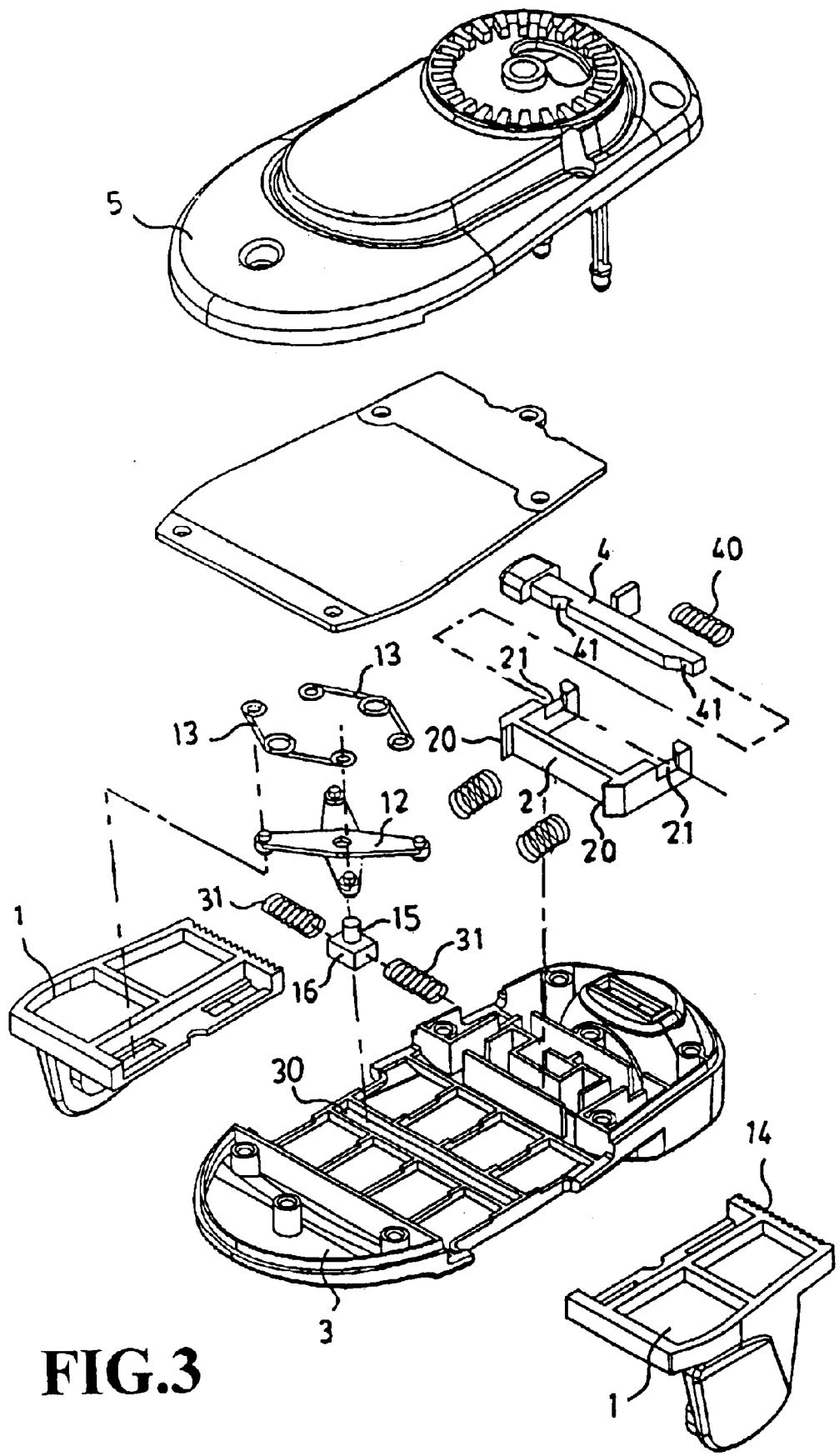
FIG. 3 is another exploded view of the preferred embodiment of the present invention.
Figure 4:
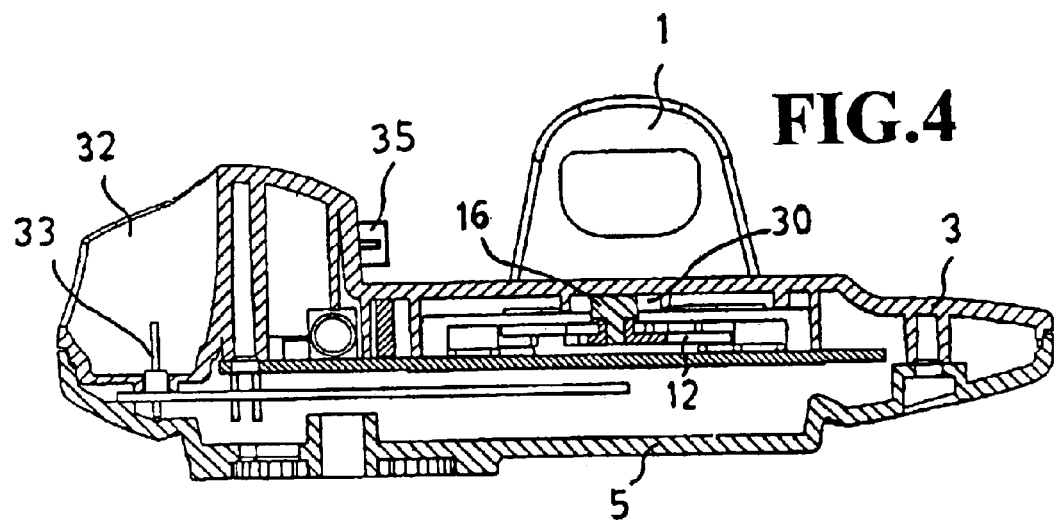
FIG. 4 is a sectional view of the preferred embodiment of the present invention.
Figure 5:
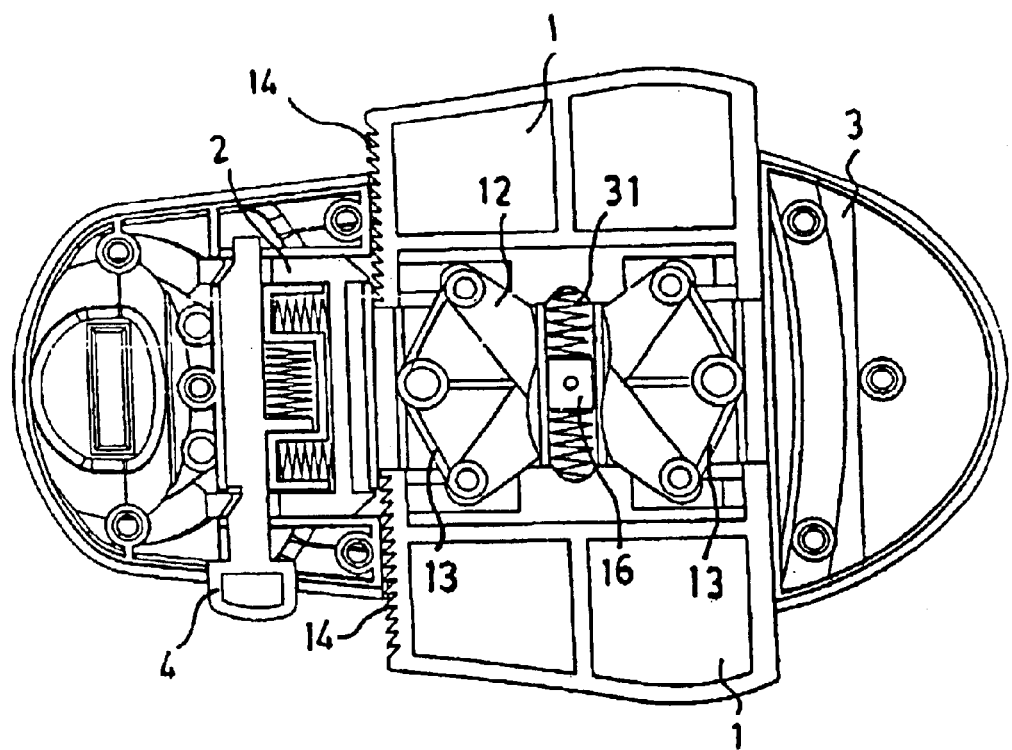
FIG. 5 is a cross-sectional view of the preferred embodiment of the present invention.

Referring to the accompanying drawings, a preferred embodiment of the present invention is essentially comprised of a holder (1), a resilient locking seat (2), a press lever (4), an upper casing (3) and a lower casing (5) in a structure is substantially similar to that disclosed in U.S. Pat. No. 5,903,645. Wherein, the holder (1) includes two identifiable halves, a right one and a left one arranged in symmetry to be inserted into where between the lower casing (5) and the upper casing (3), and respectively connected to both ends of a cross link pivoted at the center. As illustrated in FIG. 3, an insertion (16) attached to the lower end of the pivot (15) of the cross link (12) slides onto a lateral slide way (30) in the upper casing (3). A coil spring (31) is each provided on both sides of the lateral slide way (30) and a compression spring (13) is each provided on both sides between two halves of the holder (1) or two abutted ends of the cross link (12). One side of each half of the holder (1) is provided with one-way serration (14) and the resilient locking seat (2) is provided on the upper casing (3) by the serration (14). The locking seat (2) indicating a U-shape has its two stoppers (20) to protrude into the serration (14) to restrict the holder (1) so that the holder (1) is only able to clamp inwardly for displacement and hold in position. An inclined indention (21) is each provided on the rear end of the locking seat (2) to receive the insertion of a press lever (4) and the press lever (4) holds against a coil spring (40). An inclined groove (41) is each provided on one side of the press lever (4) in relation to the indention (21) from the locking seat (2). An adapter socket (35) is connected to a gap at the center of the upper casing (3) and an earphone holder (32) containing an adapter socket (35) is provided at where appropriately on the upper casing (3) to receive the insertion of a cordless earphone (34) and to also function as a switch for the control of switching transmission route of an incoming call. Furthermore, to facilitate adjusting the orientation for easy access and monitor, a connection socket (6) is provided at where below the lower casing (5) that swivels laterally at a certain angle and then gets fixed in position.

In practical use, the swivel connection socket (6) is plugged into an automobile source socket and adjusted to an orientation where allows easy access or monitor. Then the press lever (4) is depressed to make it retreating inwardly, thus displacement takes place at the inclined groove (41) to push against the inclined indention (21) for the stopper (20) to move backward and clear away from the serration (14). Consequently, the fixation force of the holder (1) disappears and the holder (1) instantly opens up when subject to the tension from the compression spring (13) until it is drawn by the cross link (12). Meanwhile, equalization from both coil springs (31) resting in the slide way (30) of the upper casing (3) push against the insertion (16) to the pivot (15) of the cross link (12). The cross link (12) moves toward the center due to the displacement of the insertion (16) for the center of upper casing (3) is at equal distance respectively to both halves of the holder (1). Once the press lever (4) is released, it automatically returns to its original place due to force from the coil spring (40). In the absence of the pushing force from the inclined groove (41) with its inherited resilience to cause the stopper (20) to advance into the serration (14) to secure the holder (1) in position. Once a mobile phone is plugged into the adapter socket (35) located between two halves of the holder (1). As one edge of the holder (1) is provided with a one-way serration (14), the holder (1) clears away inwardly from the stopper (20) to slide in one direction, thus to urge the holder (1) to be synchronously adjusted inwardly in conjunction with the draw by the cross line (12) to press onto both sides of the mobile phone, and then the mobile phone is instantly secured in position with the stoppers (20) from the resilient locking seat (2) protruding into the serration (14). A mobile phone with its socket not located at the center can also be rapidly and easily held in place by deflection of the holder (1). Wherein, the holder (1) is pushed to move to cause the insertion (16) of the pivot (15) from the cross link (12) to execute lateral displacement along the slide way (30) in the upper casing (3); consequently, the center of the holder (1) is deflected to allow adjustment to such extent that it is overlapped with the central line of the mobile phone. Furthermore, an adapter socket (33) contained in the earphone plug holder (32) provided on the upper casing (3) has dual functions for electricity continuity and as a switch. It recharges the cordless earphone (34). Meanwhile, if privacy is concerned in receiving an incoming call, just pick up the cordless earphone (34) to plug in an ear of the user, the incoming call is immediately switched to wireless transmission to be received by the cordless earphone (34). When the cordless earphone (34) is inserted into the adapter socket (33), the incoming call may be automatically transmitted with or without wire to an externally connected speaker or to the car radio to achieve hand-free talk.

The present invention, with its concept and structure having not yet seen in the market or any publication, permitting a fast and easy adjustment to hold a mobile phone having its socket not provided at the center, and hand-free talk either through a cordless earphone or a speaker to achieve significant advancement of its function meets the requirements of a utility patent.

It is to be noted that the preferred embodiment of the present invention is in no way to restrict the present invention, and any alteration or modification falling within the teaching and characteristics of the present invention shall be included in the scope of the claims of the present invention.

What is claimed is:

1. An improved structure of a mobile phone hand-free holder, includes
    an upper casing and a lower casing to hold a mobile phone and accommodate all components;
    a holder, comprised of two identical halves arranged in symmetry, having on the same side each provided at the edge a serration;
    a locking seat, related to a U-shaped resilient member provided by the side of the serration of the holder, having two stoppers to protrude into the serration to restrict the holder to only press inward for displacement or for being held in position; and
    a press lever, disposed by the locking seat to push the locking seat for releasing the stoppers from the serration; characterized by that: the holder being respectively connected to both ends of a cross link pivoted to the center of the holder; an insertion being provided to the end of the pivot of the cross link; the insertion sliding in a lateral slide way in the upper casing; a coil spring each being provided to both sides of the slide way; and two compression springs being provided to the holder or the cross link.

2. An improved structure of a mobile phone hand-free holder as claimed in claim 1, wherein, an adapter socket is provided below the holder that swivels laterally at a certain angle and then gets fixed in position.

3. An improved structure of a mobile phone hand-free holder as claimed in claim 1, wherein, additional to an adapter socket for the mobile phone, an earphone socket containing an adapter socket is also provided is provided at the center of the socket provided on the holder; an cordless earphone being plugged into the earphone adapter socket; the earphone adapter socket functioning as a switch to control transmission of an incoming phone to the cordless earphone or an externally connected speaker or a car radio.

* * * * *